Dec. 17, 1940. G. L. PUGH 2,225,231

BATTERY TESTER

Filed June 13, 1938 2 Sheets-Sheet 1

Inventor

Guy L. Pugh

By Caswell & Lagaard

Attorneys

Dec. 17, 1940. G. L. PUGH 2,225,231

BATTERY TESTER

Filed June 13, 1938 2 Sheets-Sheet 2

Inventor

Guy L. Pugh

By Caswell & Lagaard

Attorneys

Patented Dec. 17, 1940 2,225,231

UNITED STATES PATENT OFFICE 2,225,231

BATTERY TESTER

Guy L. Pugh, Minneapolis, Minn.

Application June 13, 1938, Serial No. 213,481

7 Claims. (Cl. 175—183)

My invention relates to battery testers and has for an object to provide a tester by means of which a storage battery, particularly a battery such as used for automobiles, may be tested and the performance thereof ascertained.

Another object of the invention resides in providing a battery tester in which the performance of two batteries may be compared.

An object of the invention resides in providing a battery tester in which the battery is subjected to conditions closely simulating those to which the battery is subjected when used in the automobile.

A still further object of the invention resides in providing a battery tester in which conditions are provided simulating the conditions a battery in actual use is subjected to when operated for an extended period of time for running various electrical appliances such as ordinarily found in automobiles.

An object of the invention resides in providing a battery tester in which the performance of the battery is indicated through a tachometer or some other speed indicating device calibrated to read directly in revolutions per unit of time of the engine of the automobile when being turned over by the starter.

Another object of the invention resides in utilizing a motor responsive to variations in voltage for operating the tachometer and in connecting said motor across the battery to be tested.

A feature of the invention resides in providing loads for the battery corresponding to the loads to which the battery is subjected in actual use whereby the drop in voltage of the battery under actual operating conditions will be reproduced to operate the motor and correspondingly give the number of revolutions per unit of time of the engine.

An object of the invention resides in utilizing a loading circuit having a plurality of branches, each having a separate load therein and in selectively connecting one or more of said branches in the circuit to vary the load applied to the battery.

Another object of the invention resides in arranging one of said loads to create a condition similar to that occasioned by a predetermined drop in temperature of the engine at starting.

A still further object of the invention resides in connecting, in series, with the motor, one or more resistances directly reducing the voltage across the motor without appreciably increasing the load upon the battery to create conditions similar to those encountered when the battery has been repeatedly used to operate various electrical appliances such as ordinarily found in automobiles.

An object of the invention resides in the circuits and apparatus for applying the various loads and resistances and in the manner connecting the loads and resistances in the various circuits and of controlling the operation of said circuits.

Other objects of the invention reside in the novel combination and arrangement of parts and in the details of construction hereinafter illustrated and/or described.

In supplying the trade with automobile storage batteries, the custom has been to furnish numerous types and sizes of batteries for different services and at different prices. The result is that numerous batteries are offered which have different capacities under ordinary conditions and which have still different capacities in cold climates and which have different lengths of life. In purchasing batteries, the consumer is confused due to the slight difference in the appearance of the various batteries and at a loss to know which battery to purchase. The present invention provides a battery tester by means of which two batteries may be tested and compared in such a manner that the purchaser may easily visualize the manner of the performance and the characteristics of the respective batteries under consideration and may determine for himself the suitability of the batteries for the service required.

Figure 4:
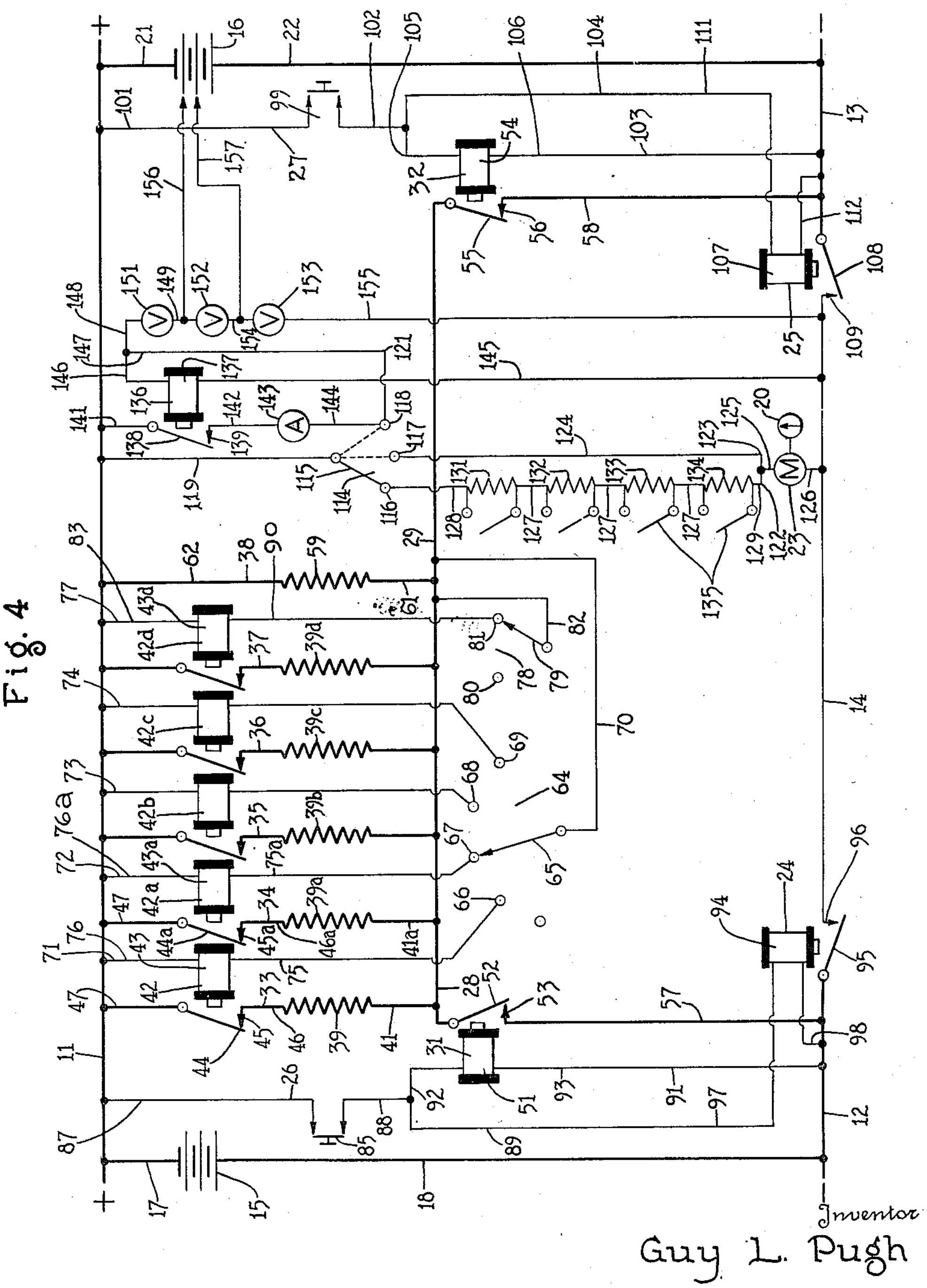
Fig. 4 is an across-the-line wiring diagram of my invention.

My invention is best disclosed in the wiring diagram in Fig. 4 which will now be described.

The invention includes a positive bus 11 and two negative buses 12 and 13 which are normally disconnected but which may be separately connected to another negative bus 14 by means of which the testing apparatus of the invention is operated. In the drawings I have shown two batteries 15 and 16 whose performance and operating characteristics are to be determined and compared. The battery 15 is connected by means of flexible leads 17 and 18 to buses 11 and 12, which leads are provided at the terminals thereof with clips or other connectors by means of which the same may be readily connected to the terminals of the batteries. The battery 16 is similarly connected by means of flexible leads 21 and 22 to the buses 11 and 13.

For indicating the performance and characteristics of the various respective batteries, a testing circuit 19 is utilized which includes a motor 23 responsive to voltage variations and which is connected to a tachometer 20. The motor 23 is connected in this circuit and the said circuit extends between the bus 11 and the bus 14. The bus 14 is adapted to be connected to either of the two buses 12 or 13 by means of two relays 24 and 25 which are controlled by two master control circuits 26 and 27.

In order to load the battery to duplicate conditions actually procured in an automobile a normally open loading circuit 28 is employed which includes a number of loads which may be connected to the battery as will be subsequently more fully described. This circuit is adapted to be closed by means of either of two relays 31 or 32 which are operated by the two master control circuits 26 and 27. These various circuits and the apparatus and equipment contained therein will now be described in detail.

The relay 31 consists of a coil 51, an armature 52 and a contact 53. Relay 32, similarly consists of a coil 54, an armature 55 and a contact 56. The loading circuit 28 includes a common conductor 29 which is connected to the two armatures 52 and 55 of the relays 31 and 32. The contact 53 of the relay 31 is connected by means of a conductor 57 with the bus 12, while the contact 56 of relay 32 is similarly connected by means of conductor 58 with the bus 13. Between the conductor 29 and the bus 11 are connected six branch loading circuits 33, 34, 35, 36, 37 and 38. Inasmuch as all of the circuits 33 to 37 inclusive are identical, excepting as to the amount of resistance in each of them, only the circuit 33 will be described in detail.

The circuit 33 utilizes a resistance 39 which forms a load for loading either of the batteries 15 or 16. This resistance is connected by means of a conductor 41 to the conductor 29. The circuit further utilizes a relay 42 which is constructed with a coil 43, an armature 44 and a contact 45 adapted to be closed when the armature 44 is attracted by the core of the coil 43. A conductor 46 connects the resistance 39 with the contact 45, while another conductor 47 connects the armature 44 with the bus 11. This completes the branch circuit 33. To simplify the discussion of the invention the conductors, resistances and relays associated with the branch circuits 34 to 37 inclusive and with the control circuits therefor will be referred to by the same reference numeral as used in conjunction with the circuit 33 together with different suffixes for each of said circuits. It will readily be comprehended that, when the relay 43 is energized and either of the relays 31 and 32 are energized, a complete circuit is had between the bus 11 and the particular bus 12 or 13 controlled by relays 31 or 32 and that such circuit includes such of the resistances as may be connected between the bus 11 and the conductor 29.

The circuit 38 is similar to the circuits 33 to 37 inclusive, excepting that a single resistance 59 is connected in this circuit and no relay is employed for closing said circuit whereby the said resistance is always connected between the bus 11 and the conductor 29. In this circuit the resistance 59 is connected by means of a conductor 61 to the conductor 29 and by means of conductor 62 to the bus 11.

The resistance 59 is of such value that the minimum load desired to be placed upon the battery tested is connected across the battery when this resistance alone is used. Due to the fact that various automobiles have different amounts of friction and produce different loads on the batteries when the engines thereof are being started by the starting motors, various resistances of different values have to be employed to duplicate the conditions imposed upon the battery when used with such automobiles. For this reason the various resistances 39a, 39b, 39c and 39d are employed and have been so selected that when said resistances, in addition to the resistance 59, are connected in the loading circuit a load of desired value can be procured. These resistances give the corresponding load at normal temperature.

In order to connect the particular desired resistance in the loading circuit a selector switch 64 is utilized. This selector switch carries a rotating arm 65 which is constructed with four contacts 66, 67, 68 and 69 adapted to be contacted by said arm. The contacts 66, 67, 68 and 69 are connected to four branch control circuits 71, 72, 73 and 74. The arm 65 of said switch is connected to conductor 29 by means of a conductor 70. The circuits 71, 72, 73 and 74 operate the various relays 42a, 42b and 42c. Each of these circuits being identical only the circuit 71 will be described in detail. This circuit includes a conductor 75 which connects the coil 43 of relay 42 to the contact 66. Said circuit further includes a conductor 76 which connects the said coil with the bus 11.

When a battery is used to start the engine of an automobile in cold weather, the lubrication of the engine is usually more viscous and considerable more energy is required to start the engine. To impose upon the battery an additional load to compensate for such additional energy required, the resistance 39d is utilized. This resistance is adapted to be connected in the loading circuit 28 by means of the relay 42d, as previously described. For this purpose another branch control circuit 77 is utilized. This circuit includes a selector switch 78 which has a swinging arm 79 and two contacts 80 and 81. The arm 79 is connected by means of a conductor 82 with the conductor 29. The contact 81 is connected with the coil 43d of relay 42d by means of a conductor 90. Another conductor 83 extends between the coil 43d and the bus 11. The contact 80 of switch 78 is the off-contact and when the switch arm 79 is on contact 80, the resistance 39 is disconnected. The resistance 39d is preferably of such value as to produce an additional load such as would result at the lowest temperature at which the battery will be required to start the automobile, as for example some sub-zero temperature as 20 degrees below.

The master control circuit 26 is a low current circuit and includes a push-button 85. This push button is connected by means of a conductor 87 to the bus 11 and further has connected to it another conductor 88. The master control circuit 26 further includes a motor control circuit 89 and a loading control circuit 91.

The loading control circuit 91 has a conductor 92 which is connected to the conductor 88 of the master control circuit 26, and to the coil 51 of relay 31. This circuit also has another conductor 93 which is connected to the coil 51 of relay 31 and to the bus 12.

The motor control circuit 89 operates the motor relay 24. This relay consists of a coil 94, an armature 95 and a contact 96 adapted to be contacted by the armature 95. Circuit 89 includes a conductor 97 which is connected to the conductor 88 of the master control circuit 26 and to the coil 94 of relay 24. Another conductor 98 connects the other side of this coil to the bus 12. Bus 12 is directly connected to the armature 95 of relay 94 and bus 14 is directly connected to the contact 96 of said relay.

The master control circuit 27 is utilized in connection with the battery 16. This circuit is similar to the circuit 26 and utilizes a push-button 99. A conductor 101 is connected to this push-button and to the bus 11. Another conductor 102 is also connected to said push-button. The circuit 27 controls two parallel circuits 103 and 104 of which the circuit 103 is the loading control circuit and 104 is the motor control circuit.

Circuit 103 consists of a conductor 105 which is connected to the coil 54 of relay 32 and to the conductor 102 of master control circuit 27. Another conductor 106 is connected to the coil 54 and to the bus 13.

The relay 25 is connected in the motor control circuit 104. This relay has a coil 107, an armature 108 and a contact 109. Circuit 104 includes a conductor 111 which is connected to the conductor 102 of circuit 27 and to the coil 107 of relay 25. The said coil is further connected by means of a conductor 112 to the bus 13. The contact 109 of relay 25 is connected to the bus 14 while the armature 108, of said relay, is connected to the bus 13.

The testing circuit of the invention is indicated by the reference numeral 19 and includes a selector switch 114 which is provided with a swinging arm 115 and three contacts 116, 117 and 118. The swinging arm 115 is connected by means of a conductor 119 with the bus 11. The circuit 19 includes three branch circuits, one designated by the reference numeral 121, being an instrument circuit. The other two circuits are motor circuits for energizing the motor 23 and are designated by the reference numerals 122 and 123. The circuit 122 is a reduced voltage branch and the circuit 123 is a full voltage branch.

The circuit 123 consists of a conductor 124 which is connected to the contact 117 of switch 114 and to a conductor 125 leading from the motor 23. Motor 23 is further connected by means of a conductor 126 with the bus 14.

The circuit 122 includes four resistances 131, 132, 133 and 134 which are connected in series by means of conductors 127. A conductor 128 connects the resistance 131 with the contact 116 of switch 114, while a conductor 129 connects the resistance 134 with the conductor 125. Each of the resistances 131 to 134 may be shunted by a jumper switch 135 which by-passes the current ordinarily passing through the same and cuts out the said resistance. It will thus be seen that, when the arm 115, of switch 114 makes contact with contact 116, the current flows from the bus 11 to the bus 14 and through the various resistances 131 to 134 or any portion of them which may be connected in the circuit which reduce the voltage across the motor 23.

Included in the instrument circuit 121 is a relay 136. This relay comprises a coil 137, an armature 138 and a fixed contact 139. Armature 138 is connected by means of a conductor 141 to the bus 11. A conductor 142 is connected to the contact 139 of said relay and to an ammeter 143. Another conductor 144 connects the ammeter 143 with the contact 118 of switch 114. The locality of connection of the conductor 141 to the bus 11 and the locality of connection of the conductor 119 to the said bus are in actuality widely spaced. The ammeter 143 is in reality a milli-voltmeter which measures the drops in a specified length of the bus 11 and thus indicates the current flowing through said bus. The coil 137 of relay 136 is connected by means of a conductor 145 with the bus 14. Another conductor 146 is connected to this coil and to another conductor 147 which in turn is connected to the contact 118 of switch 114. The instrument circuit 121 also includes three voltmeters 151, 152 and 153. The voltmeter 151 is connected to the conductors 146 and 147 by means of a conductor 148. Another conductor 149 connects the two voltmeters 151 and 152 together and a conductor 154 connects the voltmeters 152 and 153 together. Voltmeter 153 is connected by means of a conductor 155 with the bus 14. Two flexible and detachable leads 156 and 157 are connected to the conductor 149 and 154 and may, in turn, be connected to the connector bars of the battery 16 which connect the terminals of the cells of the battery together.

Figures 1, 3:
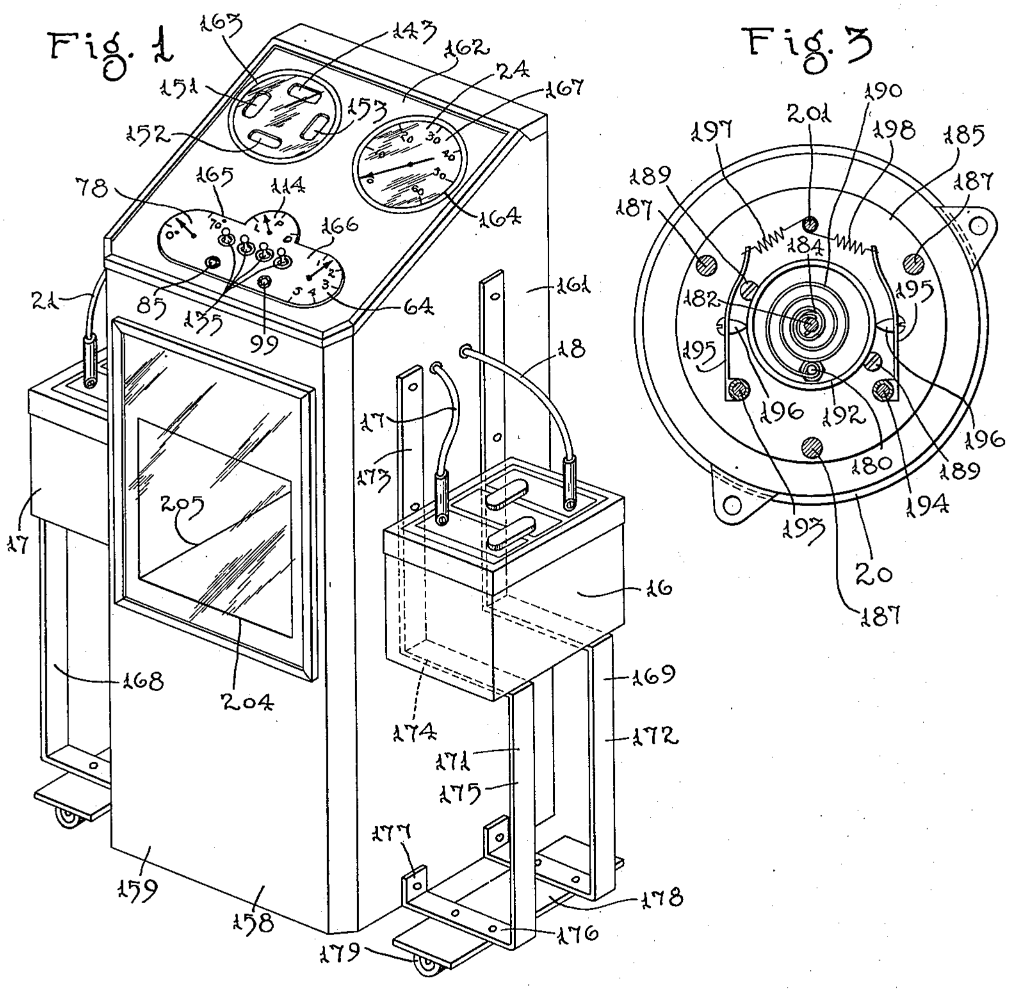
Fig. 1 is a perspective view of a battery tester illustrating an embodiment of my invention.
Fig. 3 is a sectional view taken on line 3—3 of Fig. 2.

All of the parts of my invention are contained within a cabinet 158, shown in Fig. 1. This cabinet consists of front and rear walls 159, side walls 161 and a top 162. The top 162 is constructed with openings 163, 164 and 165 which expose portions of an instrument panel 166 beneath the same. The dial 167, of the tachometer 20 is visible through the opening 165 and all of the dials of the instruments 143, 151, 152 and 153 are visible through the opening 163. The selector switches 64, 78 and 114, as well as the switches 135 and push-buttons 85 and 99, are all accessible through the opening 165. The leads 17 and 18 connected to buses 11 and 12 and the leads 21 and 22 connected to buses 11 and 13 project through the sides 161 of the cabinet 158 and are adapted to be connected to the terminals of the batteries, as shown in Fig. 1.

The batteries 16 and 17 are supported on two racks 168 and 169. Both of these racks being identical, only the rack 169 will be described in detail. This rack consists of two bars 171 and 172 which are identical in construction. The bar 171 is bent to form a portion 173 which is bolted to the side wall 161 of cabinet 158. This bar is further bent to provide a bracket 174 issuing from the portion 173. Depending from the bracket 174 is a leg 175 which terminates in a foot 176, extending back toward the wall 161. A flange 177, on this foot, is bolted to the wall 161. The battery rests upon the two brackets 174 of the bars 171 and 172 where the same is in a position to be easily connected to the apparatus by means of the leads 17 and 18. Attached to the undersides of the foot 176 is a plate 178. This plate has secured to it casters 179 by means of which the entire cabinet 158 may be readily moved about.

Figure 2:
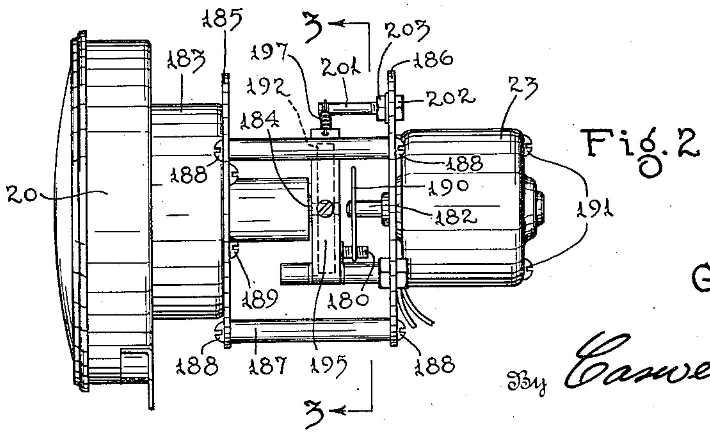
Fig. 2 is a side elevational view of the tachometer and motor for operating the same.

The motor 23 and tachometer 20 are shown in Figs. 2 and 3. Inasmuch as both motors and tachometers of the kind referred to are well known in the art, the construction thereof has not been shown in detail. The motor 23 has a case 181 and an armature shaft 182 projecting therefrom. Tachometer 20 similarly has a case 183 and a shaft 184 projecting therefrom. The motor and tachometer are mounted with their two shafts in axial alignment. For this purpose two annular plates 185 and 186 are employed which are held in spaced relation by means of posts 187 and screws 188 passing through said plates and threaded into said posts. The plate 185 is secured to the back of the case 183 of tachometer 20 by means of machine screws 189. Similarly the plate 186 is attached to the case 181 of motor 23 by means of the bolts 191 which bolt the parts of the case 181 together.

The shaft 184 of tachometer 20 has attached to it a brake drum 192. This construction is best shown in Fig. 3. Issuing from the plate 186 are two posts 193 and 194. Pivoted on these posts are brake shoe levers 195 which have attached to them brake shoes 196. These brake shoes bear against the outer periphery of the brake drum 192 and provide a load for the motor 23. Two tension coil springs 197 and 198 are hooked to the levers 195 at the ends thereof and the ends of the springs are attached to and wound in opposite direction on a shaft 201, rotatably mounted in the plate 186. This shaft is in the nature of a bolt having a head 202 and is provided adjacent said head with a lock nut 203 by means of which the shaft may be held from rotation. The springs 197 and 198 are constructed of extremely fine wire which readily bends about the shaft 201. When the shaft 201 is rotated in one direction, the tension on the springs 197 and 198 is lessened and when rotated in the opposite direction increased. In this manner the motor 23 can be loaded the desired amount so that the same may be adjusted to cause the tachometer 20 to properly read in revolutions per unit of time corresponding to the revolutions of the various engines which the batteries are to be used to start.

In the front of the cabinet 161 is provided a display window 204 and in back of said window is a compartment 205 in which commodities to be sold may be displayed.

The operation of my invention is as follows: The resistances 39a, 39b and 39c are selected so that, when taken in conjunction with the resistance 59, they afford loads for the battery to be tested which would correspond to the loads produced by the engines and starting motors of the respective automobiles with which the batteries were to be used. The tension of the coil springs 197 and 198 of the motor tachometer assembly are also so adjusted that with the resistances above specified, the tachometer is caused to read in revolutions per unit of time corresponding to the revolutions obtainable with the particular makes of automobiles for which the resistances were selected. Likewise resistance 39d is selected so that the added load produced by the desired reduction in temperature is obtained. Similarly the resistances 131 to 134 are selected to produce the reduction in voltage which would be occasioned by the continual use of the various apparatus and electrical appliances ordinarily used in an automobile as for instance radio, heater, fan and lights. With the apparatus properly adjusted and with the proper resistances installed, the user merely places one battery on each of the racks 168 and 169 and connects the leads 17 and 18 and 21 and 22 thereto. If the purchaser desires to use the battery for an automobile of a certain class or type the selector switch 64 is adjusted so that the arm 65 thereof makes contact with the corresponding contact of the contacts 66, 67, 68 or 69. Assume for example, the said switch was making contact with the contact 67. At first it would be desired to test the battery for normal use and the arm 79 of selector switch 78 would be placed on contact 80. This would cut out the relay 42d and disconnect resistance 39d. It would also be desirable to first test the batteries without any of the auxiliary equipment connected in and the selector switch 114 would be arranged with the arm 115 thereof contacting contact 117. By means of the circuits shown the two batteries 15 and 16 may be readily compared. Upon pressing the push-button 85, battery 15 is connected to the various loads and by pressing push-button 99, battery 16 is connected to the same loads. In each case a deflection of the tachometer 20 is produced which can be readily compared to indicate the relative performances of the two batteries. When the push-button 85 is closed the following circuits may be traced. On closing this push-button the master control circuit 26 is first completed. This circuit may be traced from the bus 11 and includes a conductor 87, push-button 85 and conductor 88. From conductor 88 the current flows through the motor control circuit 89 and the loading control circuit 91. The current from the conductor 88 divides the passes through conductor 97, the coil 94 of relay 24 and conductor 98 back to bus 12. The current also flows through conductor 92, the coil 51 of relay 31 and conductor 93 to bus 12. This energizes both of the relays 31 and 24 which closes the contacts formed by the armature 52 and contact 53 and the armature 95 and contact 96. This completes the loading circuit 28 and also the testing circuit 19 through the motor 23. These circuits may be traced as follows: Commencing with bus 11 current flows through the conductor 76a the coil 43a of relay 42a, conductor 75a, contact 67 of selector switch 64, the arm 65 of said selector switch and conductor 78 to the conductor 29. From conductor 29 the current flows through the relay armature 52 and contact 53 and conductor 57 to the bus 12. This energizes relay 42a and closes the switch formed by the armature 44a and contact 45a. Another circuit is now established through conductor 47, the switch of relay 42a, conductor 46a, resistance 39a, conductor 41a and to the conductor 29. From this conductor the circuit is completed to the bus 12 in the manner previously described in connection with circuit 72. The circuit 34, containing resistance 39b, is now closed and said resistance thrown on the battery 15 as a load. Since the loading control circuit 91 and the motor control circuit 89 are connected in parallel, the master control circuit relay 24 is energized at the same time that the relay 31 is energized upon the closing of pushbutton 85. This completes the testing circuit through the motor 23 as follows: On closing of the switch of relay 24, current flows from bus 11 through conductor 119, through the switch arm 115 of switch 114, through contact 117, conductor 124 and conductor 125 to the motor 23. From here the current passes through conductor 126 to bus 14 which was connected by means of relay 24 to bus 12. This energizes the motor which drives the tachometer 20 and produces a deflection on the same giving the number of revolutions per unit of time, as previously described.

The performance of the battery 15 under the conditions outlined has now been indicated by the tachometer. In order to compare the two batteries 15 and 16, the push-button 99, controlling the circuits for testing battery 16, is closed and similar circuits established to those previously referred to. As soon as the push-button 85 is released, all of the circuits referrred to are open and the device ready to be used to test battery 16. On closing switch 99, the master control circuit 27 is energized and both the motor control circuit 104 and the loading circuit 103 are energized. This closes the loading circuit 28 through the switch formed by the armature 55 and contact 56 of relay 32. At the same time the selector control circuit is operated and the resistance 39 again connected as a load but in this time to the battery 16, current being procured through the bus 13, the switch of relay 25 to motor 23. A comparison of the deflections of the tachometer 20 will indicate the relative performance of the two batteries being compared.

Assume that the purchaser was intent upon buying a battery of insufficient capacity. On starting at normal temperature the batteries would perhaps show favorably in comparison. The operator, to further show the purchaser the performance, would then manipulate the selector switch 78 and move the arm 79 thereof in contact with contact 81. This would connect in resistance 39*d* in a manner similar to resistance 39*a* and place an additional load upon the battery. The battery of less capacity would then show a lesser reading on the tachometer and in some instances would completely fail to cause the tachometer to move, thus showing that the poorer battery would be unable to start the engine of the automobile at low temperature.

To further compare the batteries, the arm 115 and selector switch 114 may be shifted to contact with contact 116. In such case the reduced voltage branch 122 is connected in the testing circuit 19 instead of the full voltage branch 123. Normally the switches 135 would be closed to shunt out the various resistances controlled thereby. As these were opened one at a time the voltage on the motor 123 would be gradually reduced and the deflection of the tachometer 20 correspondingly reduced. With the better battery the reduction in deflection would be less as the voltage was reduced and the purchaser would be immediately informed as to the added life that he could expect from the better battery.

If the selector switch 114 is operated to cause the arm 115 to engage contact 118, the instrument circuit 121 would be connected. Upon operation of the push-button 99, bus 14 would be connected to bus 13. The circuit would then be established through conductor 119, switch arm 114, contact 118, conductor 147, conductor 146, the coil 137 of relay 136 and conductor 145 to bus 14. This would energize the coil 137 of relay 136 and close the switch formed by the armature 138 and contact 139 of said relay. The instrument circuit 121 would now be complete. This circuit would include conductor 141 which is connected to bus 11, the switch of relay 136, conductor 142, ammeter 143, conductor 144, selector switch 114 and conductor 119 back to bus 11. The ammeter 143 would now be energized. The instrument circuit would also include conductor 119 which is connected to bus 11, switch 114, conductor 121, conductor 148, volt-meter 151, conductor 149, volt-meter 152, conductor 154, volt-meter 153 and conductor 155 to bus 14. If the two flexible leads 156 and 157 are connected to the connectors of the battery 16 the three volt-meters 151, 152 and 153 will indicate the respective voltages of the three cells of the battery. These can thus be compared and in the good battery all the voltages are the same. At the same time current flowing through the battery 16 and produced by the loads, previously referred to, would be indicated on the ammeter. By observing the ammeter the rapidity with which the current drops, due to rapid discharge of the current from the battery, will become indicated and with a poorer battery the current drops very rapidly showing that, if the engine is not immediately started, the battery would have insufficient capacity to cause the engine to start. It will thus be readily comprehended that two batteries may be readily compared as to performance and the voltage of the various cells and the ability of the batteries to furnish current.

The advantages of my invention are manifest. A highly practical battery tester is provided by means of which the performance of two batteries may be readily compared. By means of my invention the performance may be indicated in such a simple and effective manner that a person having no particular knowledge of batteries or electrical engineering may readily comprehend the advantages of batteries of different types. The performance of the batteries for use in different types of automobiles may also be demonstrated and the purchaser of the batteries advised as to the proper type and size of battery to use for his particular automobile. My battery tester is attractive in appearance and arranged so as to assist in the sale of batteries. All of the heavy loads are transmitted through relays so that the tester may be manually operated through push-buttons which the salesman or purchaser may operate without danger.

Changes in the specific form of my invention, as herein disclosed, may be made within the scope of what is claimed without departing from the spirit of my invention.

Having described my invention, what I claim as new and desire to protect by Letters Patent is:

I claim:

1. A battery tester comprising a loading circuit in which a battery to be tested is connected, a testing circuit connected to said battery, a motor in said testing circuit responsive to variations in voltage and subject to the voltage of said battery, said testing circuit having a reduced voltage branch for energizing said motor and a full voltage branch and a selector switch for connecting either of said branches to said motor.

2. A battery tester comprising a loading circuit in which a battery to be tested is connected, a testing circuit, a testing device in said testing circuit and responsive to voltage, said testing circuit being adapted to be connected across said battery, said loading circuit including a plurality of branch circuits each having a load therein, relays for closing said branch circuits, a control circuit having branches for energizing said relays, a selector switch connected in said control circuit and to said branch control circuits, said control circuit being connected in parallel with said loading circuit and being adapted to be energized upon the closing of said loading circuit.

3. A battery tester for batteries for automobiles, said tester comprising a tachometer calibrated to read in revolutions per unit of time of an automobile engine, a motor responsive to variations in voltage for operating said tachometer and connected across said battery, and means for selectively loading said battery in conformity with the loads subjected to batteries upon the operation of the starting motors of various automobiles.

4. A battery tester for batteries for automobiles, said tester comprising a tachometer calibrated to read in revolutions per unit of time of an automobile engine, a motor responsive to variations in voltage for operating said tachometer and connected across said battery, means for selectively loading said battery in conformity with the loads subjected to batteries upon the operation of the starting motors of various automobiles and other means for further loading the battery in accordance with the added load existing with the starting of the motors in cold weather.

5. A battery tester for batteries for automobiles, said tester comprising a tachometer calibrated to read in revolutions per unit of time of an automobile engine, a motor responsive to variations in voltage for operating said tachometer and connected across said battery, means for loading the battery in conformity with the load subjected to the battery upon operation of the starting motor of the automobile and means for further reducing the voltage across the motor in accordance with the reduction in voltage of a battery occasioned by the use of the electrical appliances operated by the battery.

6. A battery tester for batteries for automobiles, said tester comprising a tachometer calibrated to read in revolutions per unit of time of an automobile engine, a motor responsive to variations in voltage for operating said tachometer and connected across said battery, a plurality of branch loading circuits connected in parallel across said battery, resistances in said loading circuits, and means for selectively connecting said loading circuits across the battery.

7. A battery tester for batteries for automobiles, said tester comprising a tachometer calibrated to read in revolutions per unit of time of an automobile engine, a motor responsive to variations in voltage for operating said tachometer, a circuit connected across said battery and containing said motor, a plurality of resistances in series in said circuit, means for selectively shorting out certain of said resistances, and means for selectively loading said battery in conformity with the load subjected to batteries upon the operation of testing motors of various automobiles.

GUY L. PUGH.